Figure 4A:
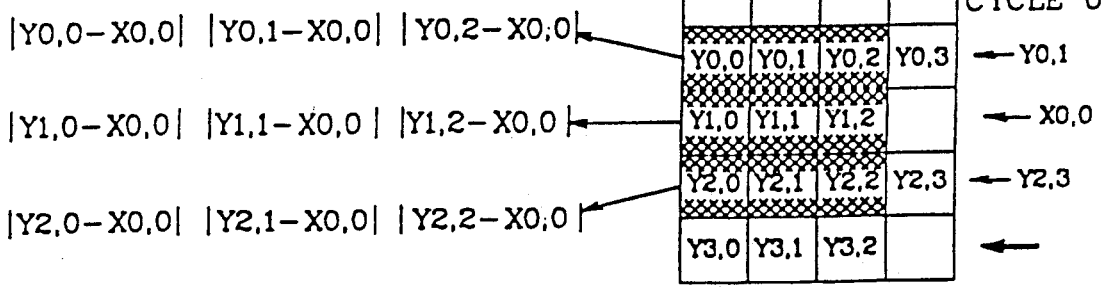

United States Patent [19]

Artieri et al.

[11] Patent Number: 5,099,325
[45] Date of Patent: Mar. 24, 1992

[54] PROCESS AND CIRCUIT FOR BLOCK MATCHING IN TWO-DIMENSIONAL PICTURE SIGNALS

[75] Inventors: Alain Artieri, Meylan; Francis Jutand, Cachan, both of France

[73] Assignee: Etat Francais represente par le Ministre des Postes, Telecommunications et de l'Espace (Centre National d'Etudes des Telecommunications CNET), Issy Les Moulineaux, France

[21] Appl. No.: 432,997

[22] Filed: Nov. 8, 1989

[30] Foreign Application Priority Data

Nov. 9, 1988 [FR] France .................. 88 14639

[51] Int. Cl.$^5$ .............................................. H04N 7/13
[52] U.S. Cl. .................................. 358/136; 358/105
[58] Field of Search ............ 358/133, 135, 136, 105; 341/106

[56] References Cited

U.S. PATENT DOCUMENTS

| | | | |
|---|---|---|---|
| 4,800,425 | 1/1989 | Schwerzel et al. | 358/136 |
| 4,837,632 | 6/1989 | Kubo et al. | 358/136 |
| 4,897,720 | 1/1990 | Wu et al. | 358/136 |

FOREIGN PATENT DOCUMENTS 0181215 5/1986 European Pat. Off.
0276434 8/1988 European Pat. Off.

Primary Examiner—Victor R. Kostak
Attorney, Agent, or Firm—Fleit, Jacobson, Cohn, Price, Holman & Stern

[57] ABSTRACT

For processing data signals representative of pixels, each of the pictures is scanned, column per column in successive horizontal bands each having a height equal to an entire fraction of the height of the picture, whereby a representation of the picture as pixels distributed in rows and columns is obtained, each band having a common predetermined number of rows. The picture is fractionated into mutually adjacent blocks of pixels each having M pixels in each of N mutually adjacent columns, M and N being predetermined integers and M being a simple multiple of the number of pixels in one column of a band and N being a whole fraction of the number of colums per image. For each of the blocks of the current picture in turn, the block is compared with each of a plurality of blocks of the same size in a search window of L columns of H pixels in the preceding image, L and H being predetermined integers greater than M and respectively the window containing the block of the current picture and the computaton being carried out in M*M cycles, namely in the time required for scanning the block of the current image, by parallel computation, during each cycle of all partial distortions between each pixel of the current block and each of the pixels corresponding thereto upon each possible offset of the block in the search window of the preceding picture. Then the best match is determined as the correspondence having the least distortion.

10 Claims, 6 Drawing Sheets

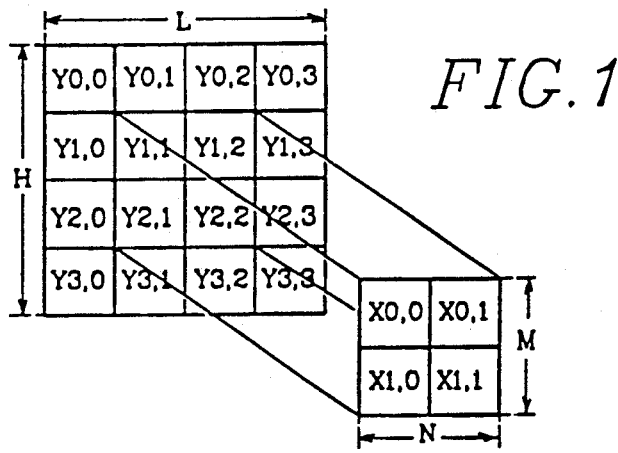
FIG.1
FIG.2
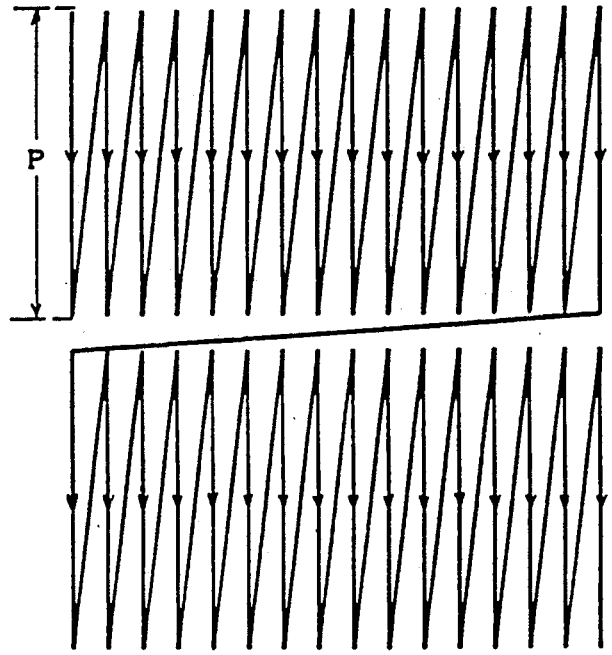
FIG.3
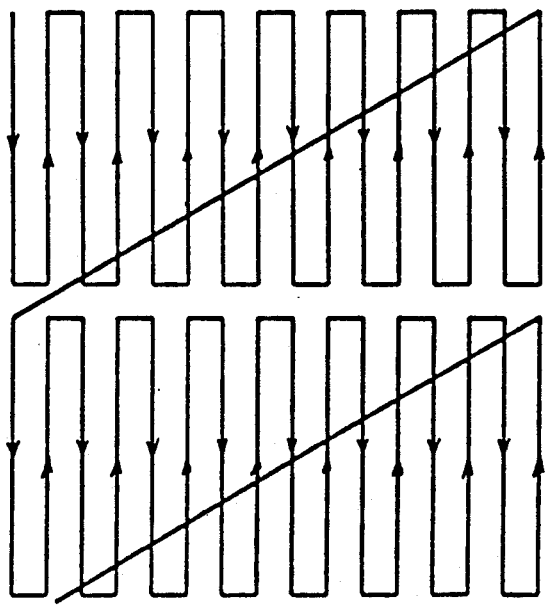

5,099,325

PROCESS AND CIRCUIT FOR BLOCK MATCHING IN TWO-DIMENSIONAL PICTURE SIGNALS

BACKGROUND OF THE INVENTION

1. Field of the Invention

The invention relates to the processing of two dimensional signals representing animated images, so as to reduce the volume of data to be transmitted or to be stored for representing such images. It finds a particularly important application in the field of visiophone and video-conference installations which raise the problem of the transmission of an acceptable quality image with a low data flow rate, for example 64 k bits per second for transmission over telephone channel.

2. Prior Art

Numerous proposals have already been made for reducing the data rate required. Some of these proposals use spatial correlation inside the image. Among the techniques which may be considered, the discrete cosine transform in encoding loops seems of particular interest.

It has also been proposed to use time correlation between successive images. The solution usually used consists, instead of transmitting signals individually representing the successive pixels of the image, in transmitting the difference between the current image signal and a predictor which is an estimation of the signal at the picture point (pixel) considered.

The value of the signal representing the same pixel in the preceding frame has in particular been used as predictor of the pixel in the current image. But this inter-image coding method does not take into account the fact that appreciable portions of the image may be in overall movement.

More advantageous methods take movement into account, which implies estimating the movement in the different portions of the image. The movement estimation method which is most interesting is the so-called block matching technique. The image is divided into blocks having a predetermined size. For each block of the current image, the most similar block is sought in a window containing the block in the preceding image. For each block, the movement vector causing this most similar block to correspond to the block of the current image is computed and it is transmitted to the decoder; a device for evaluating such a movement vector is described in European No. 0 181 215.

It is for example possible to search, in blocks of 8*8 of the current image, for the closest block in a window of 23*23 pixels.

At first sight, it would seem that the computing power required in this case, corresponding to about $1.6 \times 10^9$ operations per second for CIF (Common Intermediate Format) images, would require circuits of a complexity such that the solution is not acceptable.

SUMMARY OF THE INVENTION

An object of the invention is to provide an image processing method, as well as a circuit for implementing it, making it possible to obtain acceptable complexity for real time computation.

For that purpose, there is provided a method which requires that the image first represented by pixels obtained by column per column scanning of bands each having a predetermined height equal to a whole fraction of the height of the image. The image is cut into blocks each containing N columns of M pixels, M being a number which is a few multiple, possibly equal to 1, of the number of pixels over the height of the band and N being a whole fraction of the number of columns per image. For each of the blocks of the current image the overall minimal distortion is determined in turn by comparison of said block with each of the possible blocks of the same size in a search window of L columns of H pixels in the preceding image, which window contains the block of the current image, this computation being carried out in M*M cycles, namely exactly in the time required for scanning the block of the current image, by parallel computation, during each cycle, of all the partial distortions computed between a given pixel of the current block and each of the pixels likely to correspond thereto upon an offset or movement of the block in the search window of the preceding image. Then that one of the blocks of the preceding image which has the least distortion with respect to the block of the current image is determined typically, by line comparison, then column comparison.

The method and circuit of the invention are transposable to high definition television (HDTV) which, in order to be compatible with available transmission bands, requires signal compression. The movement vector obtained for each block by the method or circuit of the invention may then be transmitted as assistance data for approximately reforming the frames (or fields) not transmitted.

The invention also provides a circuit for block processing of two-dimensional animated image signals, having means for representing each image by pixels obtained by column per column scanning and fractionating the image into blocks of M lines and N columns, M and N being whole fractions of the number of lines and columns in the image and means for determining the best matching between a block of a current image and each block of the same size in a search window having H lines and L columns of the preceding image an important feature of the circuit is that the pixels of the current block are distributed each in turn to all the computing channels, while the pixels of the search window circulate and the partial sums are formed at a fixed position in the circuit. In particular, the circuit may comprise a matrix of (H-M+1) lines each having (L-N+1) processors (as many processors as there are possible offsets in the search window), each processor computing the distortion corresponding to a specific offset or displacement. The circuit further comprises:

means for distributing, to all the processors, data (for instance brightness or chroma) representative of the same pixel of the block of the current image during the same cycle and replacing the data relative to a pixel with the data relative to another pixel of the block when passing from one cycle to the next, until M×N cycles have been carried out;

means for applying to each processor, during successive cycles, data representative of pixels of the search window always having the same offset with respect to the pixel of the block distributed during the cycle, each of the processors being arranged for computing the distortion for a pixel, for progressively summing during the cycles, the partial distortions for all the pixels of the block and storing the cumulative values; and means for determining, by comparison between the cumulative values, the block of the search window the best matched with the block of the current image.

Figure 4B:
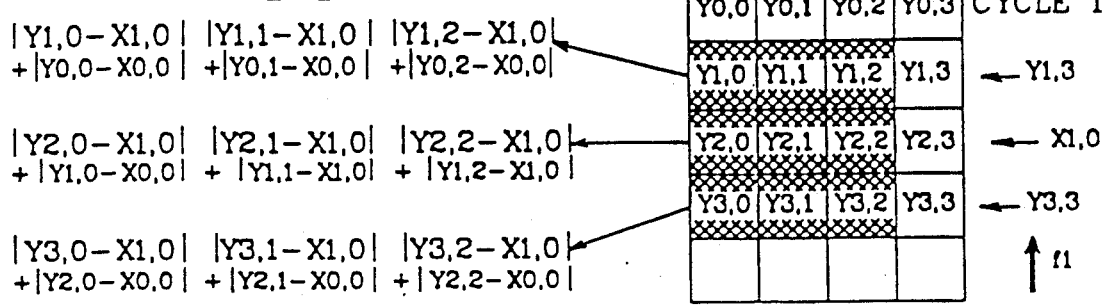
Figure 4C:
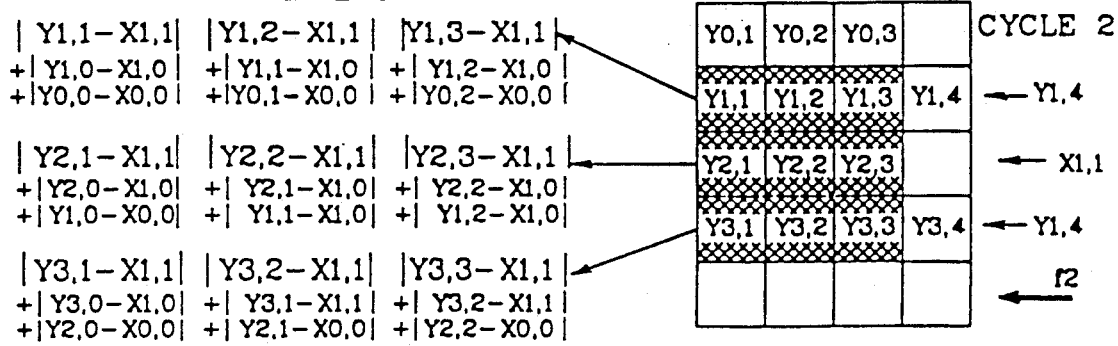
Figure 4D:
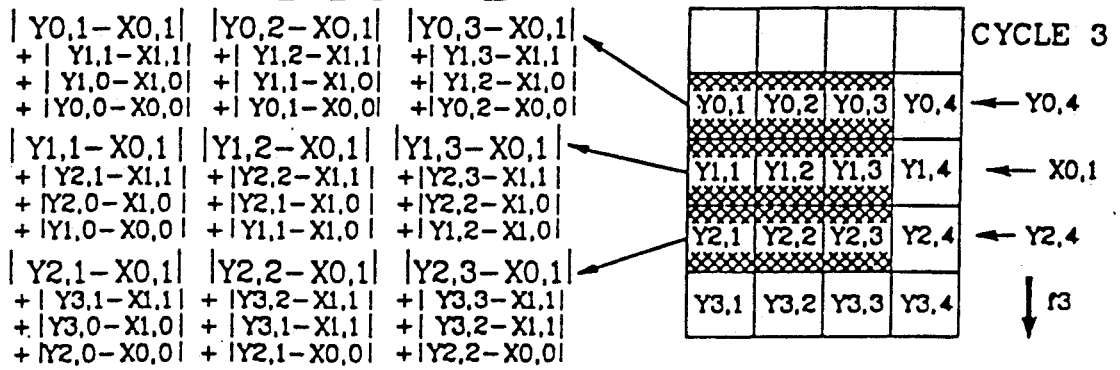
Figure 5:
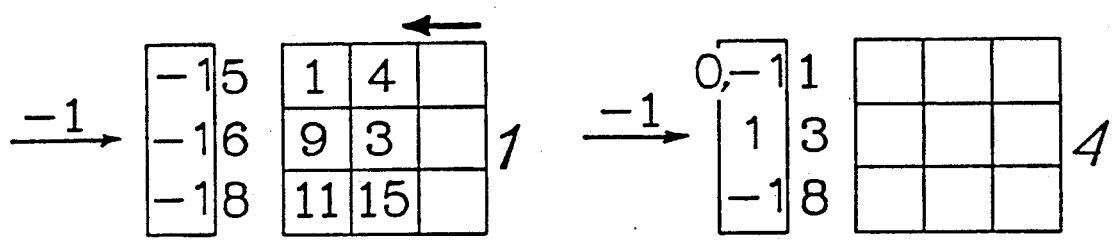
Figure 5:
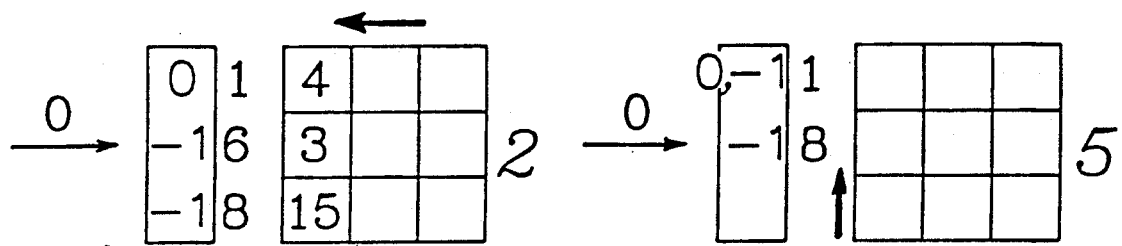
Figure 5:
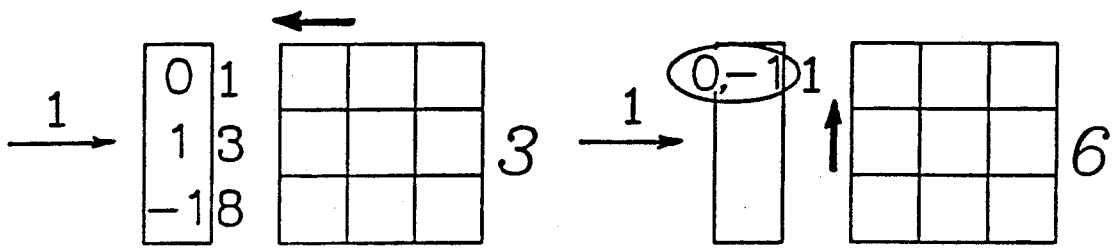
Figure 6:
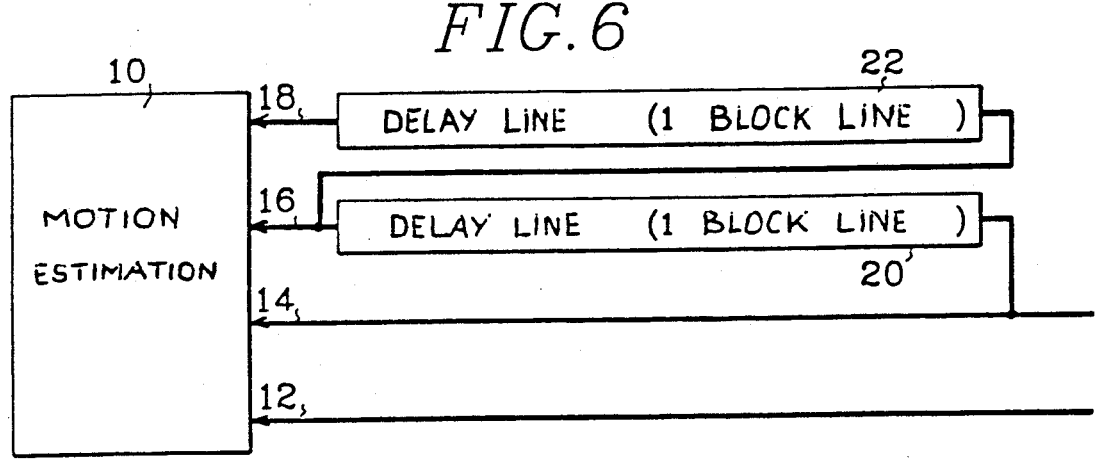
Figure 7:
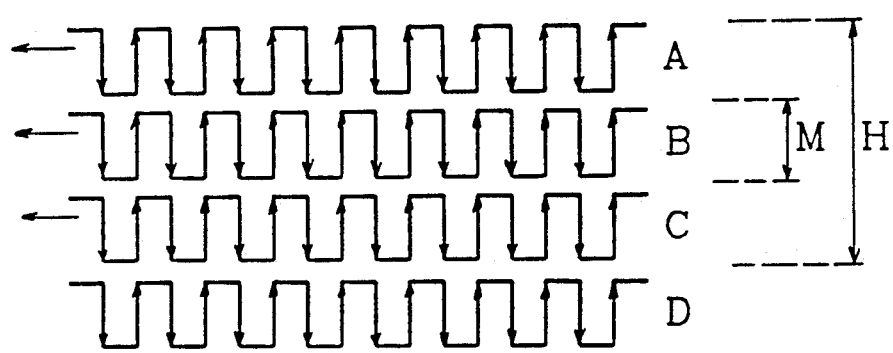
Figure 11:
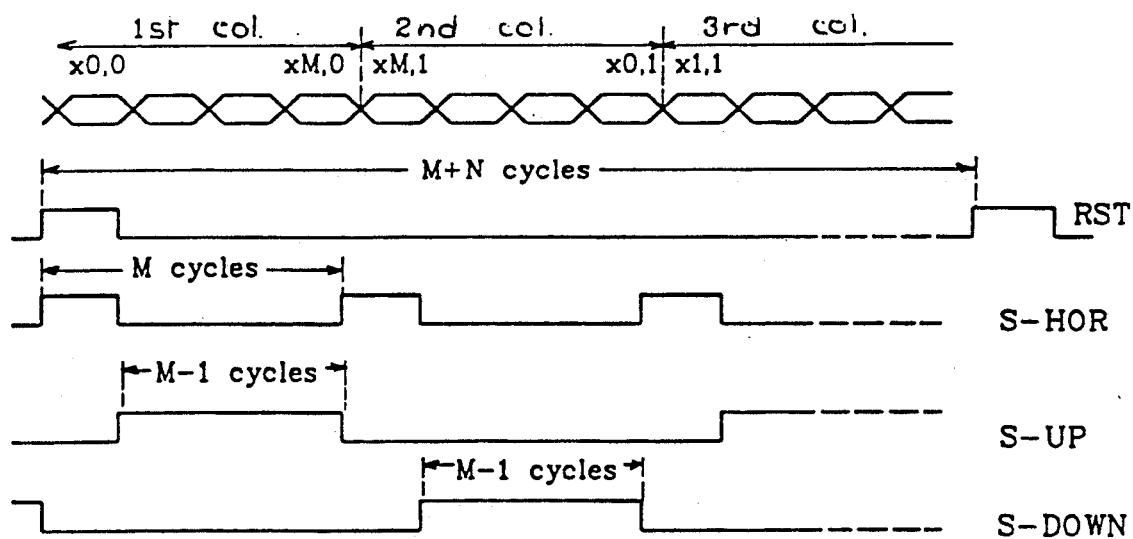
Figure 8:
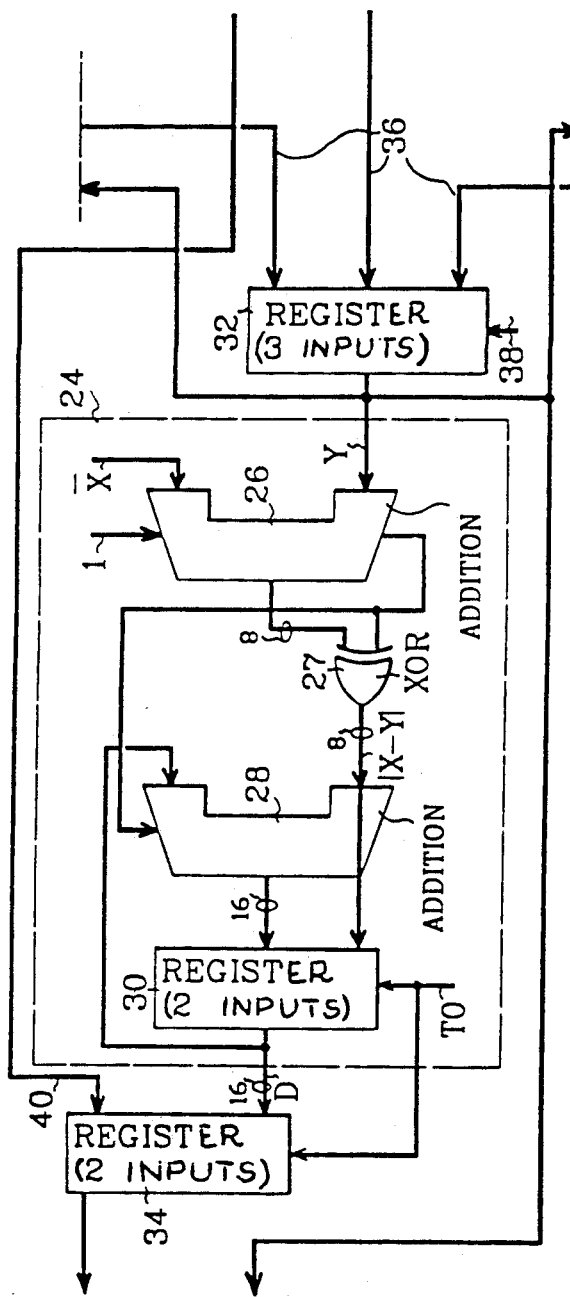
Figure 12:
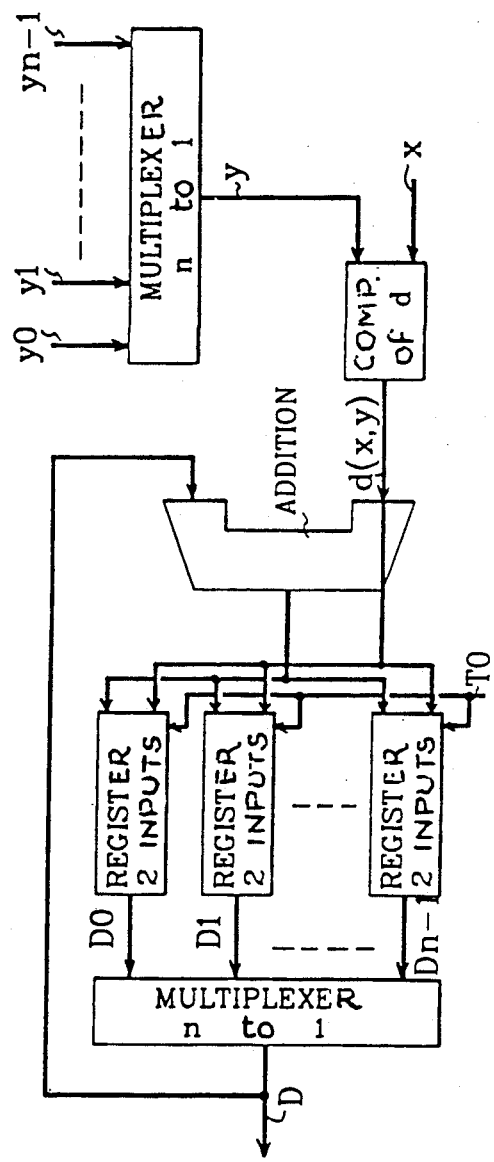
Figure 10:
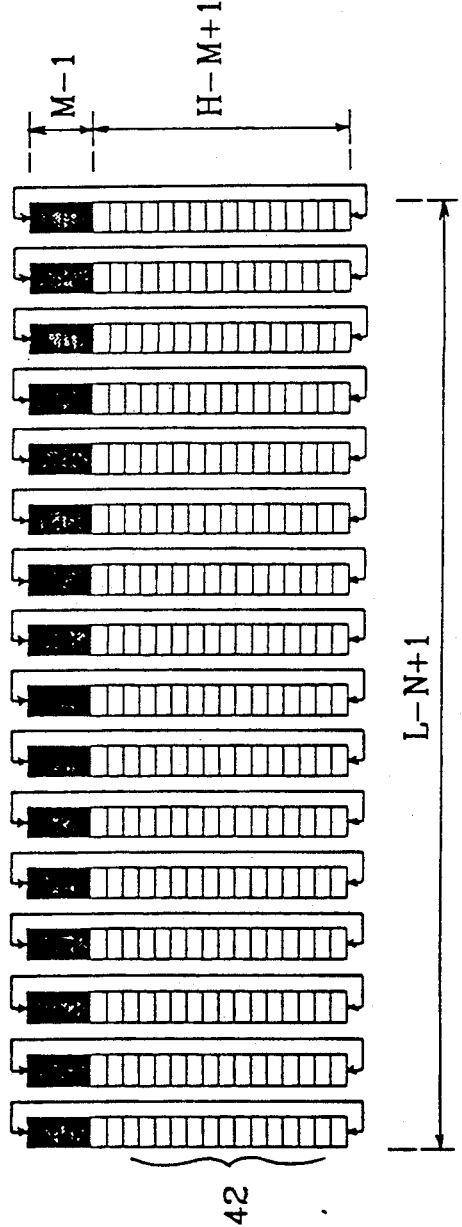
Figure 9:
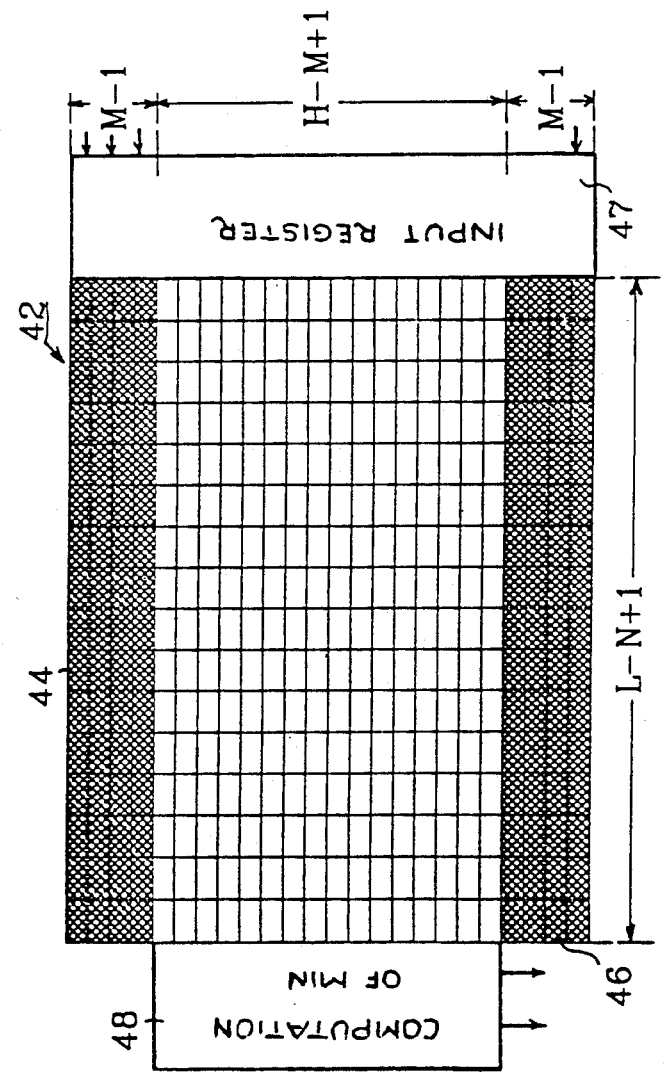

The invention will be better understood from reading the following description of a particular embodiment, giving by a way of non-limiting example. The description refers to the accompanying drawings, in which:

FIG. 1 is a diagram showing a block of four current image pixels and an associated search window, FIG. 2 is a diagram of block scanning "by column" which can be used for implementing the invention, FIG. 3, similar to FIG. 2, shows a method of block scanning "by columns" forming a variant to that of FIG. 1 and particularly well adapted for implementation of the invention, FIGS. 4A, 4B, 4C and 4D are diagrams shown in the successive cycles of a sequence searching for optimal block matching in a search window, FIG. 5 is a diagram showing a minimum computation example, FIG. 6 is a diagram showing a method of using delay lines for applying the required signals to a movement estimation circuit, FIG. 7 shows a possible method of scanning the search window, in the case where H=3M, FIG. 8 is a block diagram of basic processors, for forming a computation matrix, FIG. 9 shows a general construction of a device in accordance to the invention, FIG. 10 shows a possible variant of constructions, FIG. 11 is a timing diagram of the primary sequency signals of the device, FIG. 12, similar to FIG. 8, shows a varied construction using processes operating in share time.

Before describing a particular embodiment of the invention, it may be useful to recall the principle of estimating movement by block to block matching.

The image to be processed is split into blocks each having size M*N, M designating the number of lines and N the number of pixels on a line. For each block of a current image, the block is sought having the best correlation therewith, i.e. which is the most similar thereto in the preceding image (or another previous image) limiting the search to a window of size H*L. For that, a distortion function is computed associated with each possible displacement causing the block M*N of the current image to correspond to one of the blocks of the same size in the window H*L, referenced by a component (i,j) vector and that one of the displacements which leads to the minimum distortion is determined.

The distortion function is a two argument function; the most significant is the intercorrelation function. But it is complicated to compute and leads to computing complexity which is generally to great. For this reason, a simpler distortion D(i,j) function is used, of the form:

$$D(i,j) = \sum_{m+1}^{M} \sum_{n=1}^{N} d(x_{m,n}; Y_{m+i,n+j}) \quad (1)$$

The function $d(x,y)=x-y$ or $d(x,y)=(x-y)^2$ is usually used. We only consider after the case of $d(x,y)=|x-y|$: as block of the search window the closest to the block of the current image, that one wouldn't be chosen for which D is minimum.

In FIG. 1, M=N=2, i.e. each current image block comprises 4 pixels x0,0, . . . ,x1,1 ; H=L=4 i.e. each search window comprises 16 pixels y0,0, . . . , y3,3. In this case, (H-M+1) (L-N+1)=9 distortions are to be computed, the computation of each distortion involving N*M absolute value computations and N*M accumulations corresponds to 2NM(H+M+1) (L-N+1) operations by block. Since, in real time, a block is transmitted point by point in N*M cycles, a computing circuit is therefore required making it possible to carry out 2(H-M+1) (L-N+1) operations per cycle, namely a computing power which does not depend on the size M*N of the block but only on the number of possible displacements of this block in the search window.

The invention uses this property in particular in the choice which is made of the computing mode. In accordance to the invention, the computations corresponding to all the possible displacements of the block M*N in the window are carried out in parallel, the number of computing cycles, and it alone, depending on the size of the block.

Raster scanning is conventionally used for transmitting television images and more generally images analyzed point by point: each complete line is scanned in turn, a line blanking interval being provided between two successive lines. The method of the invention uses a different scanning method, which may be called "block scanning per column", which appreciably simplifies the architecture of the computing circuits.

FIG. 2 shows a first example of such a scanning which has the advantage of conditioning the block size M only. The image is scanned in successive bands whose height is a whole fraction of the height of the image and is equal to the height of a block or a single fraction (for instance one half) of that height M.

The reason of this latter choice is the following: if, for a block of height M (M designating an even number of lines), a band height P=M/2 is chosen and if we take H=2M, the points to be compared in the block of the current image and in the "halo" of the window of the preceding image above and below the current block are made more directly available by this type of scanning.

There is no need to describe an apparatus for providing a digital representation of an image as pixels whose succession is in accordance with the scanning sequence of FIG. 2, since it may consist of a conventional raster scan device which digitizes the successive pixels, an addressable image memory and means for reading out the memory in accordance with the required scanning.

FIG. 3 shows a modification of block scanning by columns which is even more avantageous than the preceding one. It is not directly compatible with computation of a DCT (discrete cosine transform). However transformation from one scanning method to another may be achieved in a very simple way, using a register with a sufficient capacity for containing one column of the block. If line-by-line transmission of the image takes place with conventional raster scanning, an input conversion, before picture processing properly speaking, may be carried out using a memory with a capacity equal to P lines of the picture, P being the band height for block scan.

For greater clarity, the implementation of the method of the invention will first be described when limited to a situation where the blocks and windows are of the kind shown in FIG. 1. Generalization of the method is immediate, the number of computation channels being in all cases equal to the number of possible shifts or offsets whereas the number of cycles in an elementary sequence of the method, for each block, is in all cases equal to 2M, whatever the value of N, the elementary sequence being repeated as many times as required until M*N cycles have been carried out.

FIGS. 4A to 4D illustrate respectively the computing cycles 0, 1, 2 and 3. During each cycle, nine computations are carried out in parallel, for determining the distortion for all the possible associations, but on only one of the pixels x0,0; x0,1; x1,0; x1,1 of the "current" or actual block and all the appropriate pixels in the search window in the preceding image (FIG. 1). At each cycle, all the channels receive coefficient $x_{m,n}$ (with $m\epsilon(0,1)$ and $n\epsilon(0,1)$ and all the channels operate in parallel, each computing a partial term $d(x_{m,n}*, y_{m+i,n+j})$ of the nine global distortions, such terms corresponding to the nine computations of partial distortions requiring $x_{m,n}$.

The only operations required on the pixels of the search window are then shift operations (by one position upwards, one position downwards and one position leftwards if $M=N=2$). The arithmetical operations are limited to multiplications and summations only; and it will be seen that delivery of the data defining the pixels of the window involves no complication of the inputs, that favorable result being obtained due to the nature of the scanning.

In the example shown in FIGS. 4A to 4D, the operations carried out during the four cycles are as follows.

Cycle 0 (FIG. 4A)

The data (brightness for instance) representative of pixel x0,0 is distributed to all the computing channels in parallel relation, which will each be implemented by a processor. Each of the channels computes and stores a term $(x_{0,0}, y_{i,j})$ relative to the position (i,j) which is associated with the computing channel (where $0 \leq i \leq 3$ and $0 \leq j \leq 3$).

The left hand part of FIG. 4A shows the nine results which appear simultaneously and correspond to the respective distortions between pixels y0,0; ...; y2,2 and pixel $x_{0,0}$.

Cycle 1 (FIG. 4B)

During cycle 1, the nine products $(x_{1,0}, y_{1+i,j})$ are computed in parallel. For that, each of the computing channels must receive data representative of the pixel of the search window situated immediately below the one which was used during cycle 0. In other words, it is necessary to shift all the pixels of the search window by one position upwardly, as shown by arrow f1, before computing the distortion corresponding to the nine possibilities.

During the same cycle 1, the partial distortion corresponding to the offset is added to that of cycle 0 by summation, as is shown in the left hand part of FIG. 4B.

Cycle 2 (FIG. 4C)

Cycle 2 corresponds to computation of all distortion products for pixel x1,1: each processor therefore computes one of the terms $d(x_{1,1}, y_{1+i,1+j})$. For that purpose, all points of the search window are shifted by one position leftwards (arrow f2) before the partial distortions are computed and summed with the preceding distortions (left hand part of FIG. 4C).

Cycle 3 (FIG. 4D)

During cycle 3, the same computation is carried out as in cycle 2 but on x0,1, which requires shifting all the points of the search window by one position downwardly (arrow f3). Each partial distortion computed is added to the corresponding partial or interim result for each of the possible offsets; consequently the global distortion is obtained for the whole block corresponding to each of the nine possible offsets.

The minimum among the nine distortions and the vector defining the shift which causes a block of the current image to correspond to the block of the preceding image for which the distortion is minimum may then be determined.

The operations shown in FIGS. 4A to 4D are advantageously carried out using a circuit comprising a matrix array of 3*3 processors each forming a channel and each capable of storing the data representative of one pixel of the search window and the result of the computed distortion corresponding to an offset; and additional registers for storing pixels of the window delivered during each cycle, which are not used for computation during this cycle, but during the next computation cycle.

If the hatched portions on FIGS. 4A to 4D are considered as representing the processors required, it can be seen that the data transfers, outside the initialization periods, are as follows:

At the beginning of cycle 0, the data y0,0 to y2,2 are already available in the processors from the preceding sequence of cycles; x0,0 is distributed to all processors; y0,3 and y2,3 are applied to the inputs of the matrix array and stored in input registers.

At the beginning of cycle 1, the data x1,0 is distributed to all processors; the data y1,3 and y3,3 are introduced into the input registers: these input registers then contain the whole of the following column of the search window, i.e. all pixels of the next column in the search window. The content y of the processors is shifted by one position upwardly (arrow f1).

During cycle 2, the data x1,1 is distributed to all the processors and the pixels of the search window are shifted by one position leftwardly (arrow f2). At the same time, the data y1,4 and y3,4 are introduced into the corresponding input registers.

Finally, during cycle 3, when the data x0,1 is distributed and the window is shifted downwardly (arrow f3), the data y0,4 and y2,4 are introduced: thus those data y which are required for beginning the sequence of cycles corresponding to the following block of the picture are available.

The minimum of D is computed in two phases.

1. During the first phase, the stored distortions are offset towards an edge of the matrix and fed to a column of operators, an operator being assigned to the computation of the minimum among the line distortions.

It will be assumed first of all that the shift takes place leftwards, which corresponds to the case illustrated in FIG. 4A.

In the first cycle, each operator then receives a distortion corresponding to the most leftward possible horizontal offset of block M*N, i.e. an offset of $-1$ leftwards as illustrated.

Each operator stores the distortion D and the associated offset along x.

In the second cycle, each operator receives the next distortion and compares it with the stored distortion: if the new distortion is smaller, it stores it as well as the associated offset, equal to the offset of the preceding cycle incremented by 1: a counter is sufficient to determine the offset.

The same operation is again repeated until all possible distortions have been applied to the column of operators, each operator then containing the minimum among the distortions of each line and the associated offset.

2. The second phase consists in determining the minimum among all distortions stored in the operators: the operation follows directly from the preceding one.

An example is given in FIG. 5 for a better understanding of how the minimum value and the respective vector are determined: in this Figure, step "zero" consists of determination of the matrix of the distortions, obtained by the method already described and illustrated in FIGS. 4A–4D. It can be seen that the minimum distortion is equal to 1 and corresponds to the position (0, −1). The first phase described above corresponds to steps 1, 2 and 3 of FIG. 5. The second phase, i.e. search for the minimum minimorum is formed by steps 4, 5 and 6.

A circuit will now be described forming a possible implementation of the method which has just been described, assuming that the adopted scanning method is the modified column per column scanning shown schematically in FIG. 3. It will be further assumed that the blocks have a size M*N and the search window has a size H*L. The whole number equal to or higher than M/H (preferably just greater than M/H) will be designated as K.

As shown in FIGS. 4A to 4D, the values of the points of a complete column of the search window must be fed during the time devoted to processing a column of the block: with M = 2 and H = 4, K = 2 inputs are required for feeding the blocks of the search window.

The example given in FIGS. 6 and 7 corresponds to K = 3, which corresponds for example to 8*8 blocks and a 23*23 search window.

The motion estimation module 10 then receives on an input 12 the values X of the pixels of the current image. For processing the blocks defined by band B of the current picture (FIG. 7), the pixels of bands A, B and C of the preceding picture should be available to the estimation module 10. For that, the three inputs 14, 16 and 18 of the estimation module 10 respectively receive the picture signals of the band of blocks C immediately below the band of blocks B in the preceding picture, the picture signals of the band of blocks B in the preceding picture, obtained through a delay line 20 having the capacity required for storing one band of blocks and, last, F. To sum up, inputs 12 and 16 correspond to the same pixels with a time offset of one picture; inputs 14 and 16 correspond to the same pixels with a time offset corresponding to one band of blocks.

After the blocks defined by band B have been processed, processing of the band of blocks C and D in the current image may begin: then the pixels of the bands of blocks B', C' and D of the preceding picture are delivered to module 10 (FIG. 7).

The core of the motion estimation module 10 is formed as a matrix array of (H-M+1) lines each having (L-N+1) processors each for computing a distortion. The position occupied by the processor in the matrix array corresponds to the offset of the block in the search window for which distortion is computed.

Each of the processors of module 10 may be constructed as shown schematically in FIG. 8 in the case where d(X,Y) is the absolute value of a difference. X is a data common to all processors, delivered by a common input, and Y is a local data specific to each processor. The processor may be regarded as comprising a distortion computing circuit 24, an input register 32 and an output register 34.

The computation circuit 24 comprises an adder 26 which receives the common data X and the local data Y; the adder is associated with an XOR gate 28 which makes it possible to determine |X-Y| and delivers it to one of the inputs of an accumulator formed of an adder 28 and a register 30. The second input of the adder receives data fed back from the output of register 30. The output of the adder and |X-Y| are respectively applied to the two inputs of register 30 which sums the partial distortions. The output of the register being re-applied to the input of adder 28, D appears at the output of register 30 at the end of all the computing cycles. An initialization input T0 makes it possible to clear the accumulator after each block processing operation.

The input register 32 makes it possible to recover a new data Y originating either from the processor placed above in the matrix array, or from the processor placed below, or from the processor placed at right. For that, it comprises three data inputs 36 and a selection input 38.

The output register 34 stores either the distortion contained in the accumulator formed of adder 28 and of register 30 of the computing circuit 24 (the transfer taking place during the initialization cycle of the accumulator responsive to signal T0), or the contents of the output register of the processor 24 situated at the right of the processor considered. For that, the register 34 has an input receiving distortion D, an input 40 receiving the contents of the register of the processor situated at the right and a control input receiving the synchronization signal To.

It is in particular possible to use data encoded on eight bits, the components of the accumulator then being provided for processing sixteen bit words and summing up to 256 partial distortions without overflow.

The motion estimation module 10 shown in FIG. 9 comprises, in addition to the matrix array of (L-N+1)*(H-M+1) processors, two groups 44 and 46 of additional registers. The additional registers are for receiving the pixels of the window which are outside the matrix array of processors when a vertical shift takes place: it is then necessary to have (H-M) lines each having (L-M+1) three input registers, organized in the same way as the input registers 32 of the matrix array of processors.

In FIG. 9, the additional registers are grouped into (H-M) lines of registers above the processors and (H-M) lines of registers below the processors. Another solution, more favorable as regards the number of additional registers required, is shown in FIG. 10. It consists in using only the number of additional registers strictly required (shown with hatching) with feed back through the processor matrix array 42. But this solution requires a greater transparency of the processor matrix array.

Finally, the module comprises a general input register 47, at the right of the processor matrix array, and a unit 48 for determining a minimum, at the left of the matrix array, in the case of the above-considered shifts and offsets.

The general input register operates in the same way as registers 32 and unit 48 may have a construction similar to that of FIG. 8, however for fulfiling the function illustrated in FIG. 5.

Sequencing of the different components of the processing circuit described above is quite simple, since four synchronization signals are sufficient, used directly or combined with the general clock signal of the circuit, delivered by a local clock (not shown).

FIG. 11 shows the time distribution of the four signals with respect to the clock signal, shown on the upper line.

The reset signal RST indicates the beginning of computation process: it causes transfer of the results of the computation already carried out for the preceding block. It is therefore equivalent to the signal $T_0$ shown in FIG. 8.

The horizontal shift-to-left signal S-HOR controls the horizontal shift leftwards of pixels of the window as a whole and causes the shifts during cycles 0 and 2 of the example. This signal indicates therefore the beginning of the processing of a new column and is in phase with the processing of the first pixel of the column.

The vertical upward shift signal S-UP causes the shifts required during M-1 cycles for carrying out the computations corresponding to the M-1 pixels remaining in a column run through from top to bottom.

The vertical downward shift signal S-DOWN plays an identical role for a column run through from bottom to top.

The signals S-UP for upward shift and S-DOWN for downward shift of the points of the window occur alternately, each with a duration of M-1 cycles.

The elementary sequence of 2M cycles therefore consists, in that order, of one horizontal shift cycle activated by S-HOR followed by M-1 cycles of upward shifts enabled by S-UP followed by a horizontal shift cycle enabled by S-HOR followed by M-1 cycles of downward shifts enabled by S-DOWN.

The invention may be implemented using conventional CMOS technologies. For a movement estimation circuit operating at the pixel rate for maximum displacements of $-8$ pixels to $+7$ pixels in the vertical and horizontal direction, namely in all 256 possible displacements, the number of transistors would be 390 000. To reduce this number, it is possible to operate the same processor in shared time between several distortion computations, as long as the internal operating frequency is multiplied.

If, for example, the same processor carries distortion computations, the frequency of the internal timing clock of the processor must be multiplied by N and the diagram of FIG. 8 becomes that of FIG. 12.

This technique is interesting for the maximum operating frequency which is possible using present day CMOS technologies is much higher than the pixel rates of most of the applications.

For example, a ratio 2/1 between the operating frequency and the pixel rate makes it possible to reduce the number of transistors of the herein described circuit to 240 000.

We claim:

1. Process for processing of data signals representative of pixels of successive pictures of a two-dimensional animated image, comprising the steps of:
   (a) scanning each of the pictures, column per column in successive horizontal bands each having a height equal to an entire fraction of the height of the picture, whereby a representation of the picture as pixels distributed in rows and columns is obtained, each band having a common predetermined number of rows,
   (b) dividing said picture into mutually adjacent blocks of pixels each having M pixels in each of N mutually adjacent columns, M and N being predetermined integers and M being a simple multiple of the number of pixels in one column of a band and N being a whole fraction of the number of columns per image;
   (c) for each of the blocks of a current picture in turn, comparing the respective block with each of a plurality of blocks of the same size in a search window of L columns of H pixels in the preceding image, L and H being predetermined integers greater than M and N respectively, said window containing said block of the current picture and said computation being carried out in a number of M*M of cycles, namely in the time required for scanning the block of the current image, by parallel computation, during each cycle, of all partial distortions between each pixel of the current block and each of the pixels corresponding thereto upon each possible offset of the block in the search window of the preceding picture; and
   (d) determining which one of the blocks of the preceding picture has the least distortion with respect to the block of the current image, by line to line comparison, then column to column comparison.

2. Process according to claim 1, wherein, the distortion for each pixel is defined as the absolute value of the difference between a data representative of said pixel in the current picture and the data representative of that pixel in the preceding picture which is compared therewith.

3. Process according to claim 1, wherein, the distortion for each pixel is defined as the square of the difference between a data representative of said pixel in the current picture and the data representation of the same feature for that pixel in the preceding picture which is compared therewith.

4. Process according to claim 1, wherein each of said columns of said bands has M or M/2 pixels and wherein H=2M.

5. Circuit for block processing of data signals representative of successive features of a two-dimensional animated image, having:
   (a) representation means for representing each picture as pixels obtained by column per column scanning and for dividing the image into blocks of M lines and N columns, M and N being whole fractions of the number of lines and columns in each of the pictures; and
   (b) computing means for determining the best matching between a first block of a current picture and each block of the same size in a search window having H lines and L columns of the preceding picture, said computing means being arranged for distributing the pixels of the current block each in turn to all of a plurality of computing channels, while the pixels of the search window are circulated between the channels and comprising adding means for summing distortions, at a fixed position in said computing means.

6. Circuit for block processing of data signals representative of successive pictures of a two-dimensional animated image, having:
   (a) representation means for representing each picture as pixels obtained by column per column scanning and for dividing the image into blocks of M lines and N columns, M and N being whole fractions of the number of lines and columns in each of the pictures; and (b) means for determining the best matching between each of said blocks in a current picture and each block having the same size in a search window having H lines and L columns of an immediately preceding picture, H and L being predetermined integers respectively greater than M and N, wherein said second means comprise:

(b1) a matrix of (H-M+1) lines each having (L-N+1) processors, each processor computing the distortion corresponding to a specific offset or displacement;

(b2) first means for distributing, to all said processors, a data signal representative of a given pixel of the block of the current picture during a same computing cycle and replacing the data relative to a pixel with the data relative to another pixel of the current block when passing from one cycle to the next, until M×N cycles have been carried out;

(b3) second means for applying to each processor, during successive cycles, data representative of pixels of the search window always having the same offset with respect to the pixel of the current block distributed during the cycle, each of the processors being arranged for computing the distortion for a pixel, for progressively summing during the cycles, the partial distortions for all the pixels of the block and storing the accumulated values; and (c) comparison means for determining, by comparison between the accumulated values, that block in the search window which best matches with the block of the current picture.

7. Circuit according to claim 6, wherein said second means are arranged for simultaneously moving all pixels of the preceding image within the matrix along such path that after M×N cycles, each processor has accumulated all partial distortions for a predetermined offset.

8. Circuit according to claim 6, wherein said comparison means for determining the best match comprise a column of operators and means for operating the operators in as many cycles as there are possible offsets in the line direction for determining which one of the offsets in the line direction corresponds to a minimum distortion and for storing the respective offset representing vector and means operating in as many cycles as there are possible offsets in the column direction for determining which one among the respective offset representing vectors corresponds to the smallest possible distortion.

9. Circuit according to claim 8, wherein each of said processors includes a distortion computation circuit, an input register and an output register, the output registers being so interconnected as to enable determination of the best matching.

10. Circuit according to claim 9, wherein the computation circuit has a partial distortion computing unit and adder-accumulator means.

* * * * *